(12) United States Patent
Kilmer

(10) Patent No.: US 6,809,905 B2
(45) Date of Patent: Oct. 26, 2004

(54) ELECTRICAL INTERCONNECT SCHEME

(75) Inventor: Dan L. Kilmer, Seiad Valley, CA (US)

(73) Assignee: KLA-Tencor Technologies Corporation, San Jose, CA (US)

( * ) Notice: Subject to any disclaimer, the term of this patent is extended or adjusted under 35 U.S.C. 154(b) by 353 days.

(21) Appl. No.: 09/996,481

(22) Filed: Nov. 27, 2001

(65) Prior Publication Data

US 2003/0099066 A1 May 29, 2003

(51) Int. Cl.[7] .......................... G11B 21/08; G11B 5/55; H01R 39/00; H01R 12/24
(52) U.S. Cl. ...................... 360/264.2; 439/17; 439/493
(58) Field of Search ............................ 439/17, 493, 65, 439/66, 67, 68, 69, 260; 360/264.2, 266.1, 244.1, 245.8, 245.9, 264.1, 264, 260, 250, 240, 75, 77.07, 77.05, 98.01, 78.14, 31

(56) References Cited

U.S. PATENT DOCUMENTS 4,162,817 A * 7/1979 Briggs et al. ............... 439/329
5,241,438 A    8/1993 Matsushima ............. 360/254.8
5,295,852 A * 3/1994 Renn et al. .................. 439/328
5,455,728 A   10/1995 Edwards et al. .......... 360/256.2
5,462,441 A * 10/1995 Renn et al. .................... 439/67
5,532,889 A    7/1996 Stefansky et al. ........ 360/97.01
5,733,151 A * 3/1998 Edsall et al. ................ 439/729
5,760,997 A    6/1998 Koyanagi et al. ......... 360/97.01
6,030,243 A * 2/2000 Harting et al. .............. 439/260

FOREIGN PATENT DOCUMENTS

DE          198 01 173          7/1999

OTHER PUBLICATIONS

IBM TDB, Dec. 1989, v. 32, No. 7, pp. 344–345.*

* cited by examiner

Primary Examiner—Julie Anne Watko
(74) Attorney, Agent, or Firm—Irell & Manella LLP

(57) ABSTRACT

A connector that can couple a flexible circuit board of a head gimbal assembly to driving circuits of an apparatus coupled to a hard disk. The connector includes a pair of spring biased plates that push the flexible circuit into contact with a printed circuit board. The circuit board is coupled to the driving circuits. The pressure plates can be manually pushed into an open position to allow an operator to insert or remove the flexible circuit board from the connector.

28 Claims, 2 Drawing Sheets

ELECTRICAL INTERCONNECT SCHEME

BACKGROUND OF THE INVENTION

1. Field of the Invention

The subject matter disclosed generally relates to the field of servo writers and disk certifiers for the disks of hard disk drives.

2. Background Information

Hard disk drives contain a plurality of heads that are magnetically coupled to one or more disks. The heads write and read information by magnetizing and sensing the magnetic fields of the disks. The information is typically stored within annular tracks that extend radially across the disks.

The heads are typically mounted to flexure arms that are attached to an actuator arm. The actuator arm includes a voice coil that can move the heads across the disks to access the annular tracks. It is desirable to position the heads at the center of the annular tracks. Deviations from the track centerlines may cause errors in reading and writing data. The heads are centered with a servo routine that utilizes servo bits embedded into the annular tracks.

The servo bits are typically written at the manufacturing facility of a disk drive manufacturer by a system commonly referred to as a servo writer. The servo writer contains electrical circuits that are coupled to the heads of a disk drive. The servo writer causes the heads to write servo bits onto the disks in accordance with a servo writing routine.

Historically, the process of "servowriting" has been performed at the HDA (head-disk-assembly) level of the Hard Disk Drive. Because earlier drives utilized multiple disks and heads, and with fewer servo tracks to write, (due to lower disk data density), servo write time was accomplished in a few minutes. However, the number of servo tracks has continued to increase along with disk data density, and the time required to write and verify all the servo tracks has increased dramatically. Also, because of the data density increases, many hard disk drives today only have a single disk, whereas previously, multiple disks were required. Therefore, for economy of manufacturing, servowriting of multiple disks prior to assembly into the HDA is fast becoming desirable. One manifestation of writing at the disk level, however, is that the same bank of heads is used to write many disks, rather than at the HDA level, where the drive's own heads were used only once to write the servo tracks. Due to wear and tear, the servo-writer heads must be changed periodically.

The heads of a disk drive were historically coupled to a pre-amplifier circuit by soldering two or more twisted wires directly to the flexcircuit. To improve manufacturing efficiencies and high frequency electrical performance, some disk drives utilize flexible circuit boards to couple the heads to the pre-amplifier. A flexible circuit board includes metal traces that are located between a pair of flexible dielectric strips. The traces terminate at contact pads located at the end of the flex circuit. In a hard disk drive, termination to drive electronics is typically done via ultrasonic or laser bonding.

Soldering, ultrasonic or laser bonding of head terminations, however, is simply not acceptable for use at the multiple disk servowriter level due to logistical, cost, and contamination issues. Therefore, in a multiple disk servowriter, it is desirable to couple the heads to servo writer circuits via some sort of electrical connector. Due to severe space limitation, as well as the high number of electrical connections, typically 4 or 5 per head, most commercially available connectors are not applicable. Some prior applications have used spring-biased "pogo" pins for termination to the head flex circuit pads.

However, pogo pins are susceptible to bending and must sometimes be replaced. Additionally, pogo pin connectors are bulky and difficult to solder onto a corresponding printed circuit board.

BRIEF SUMMARY OF THE INVENTION

A connector for an apparatus coupled to a hard disk. The connector includes a spring coupled to a pair of pressure plates. The connector further includes a printed circuit board located between the pressure plates.

DETAILED DESCRIPTION

Disclosed is a connector that can couple a flexible circuit board of a head gimbal assembly to driving circuits of an apparatus coupled to a hard disk. The connector includes a pair of spring biased plates that push the flexible circuit into contact with a printed circuit board. The circuit board is coupled to the driving circuits. The pressure plates can be manually pushed into an open position to allow an operator to insert or remove the flexible circuit board from the connector. The apparatus described herein is for a very compact, rugged, easily modifiable, and scalable electrical interconnect scheme which allows quick head changes with no secondary termination process, such as solder, ultrasonic bonding, etc.

The printed circuit board has gold plated pads on each side which match the pad locations on the head termination flexcircuits. One PCB can terminate two heads, one on each side. Typically, 4 pads per side are provided for use with modern MR or GMR type read write heads. The PCB also has one or more locating pins, to provide accurate registration of the head flexcircuit on each side of the PCB. Each pressure plate has small protrusions to provide point contact pressure over the center of each termination pad. Therefore, when the head flexcircuit(s) are positioned onto the PCB and the springloaded pressure plates installed over the flexcircuits, the pads on the head flexcircuit are forced against the gold plated pads on PCB at the protrusion points on the pressure plates. Additionally, the pressure plates are designed with an integral spring "finger", to allow for normal manufacturing thickness variations.

Figure 1:
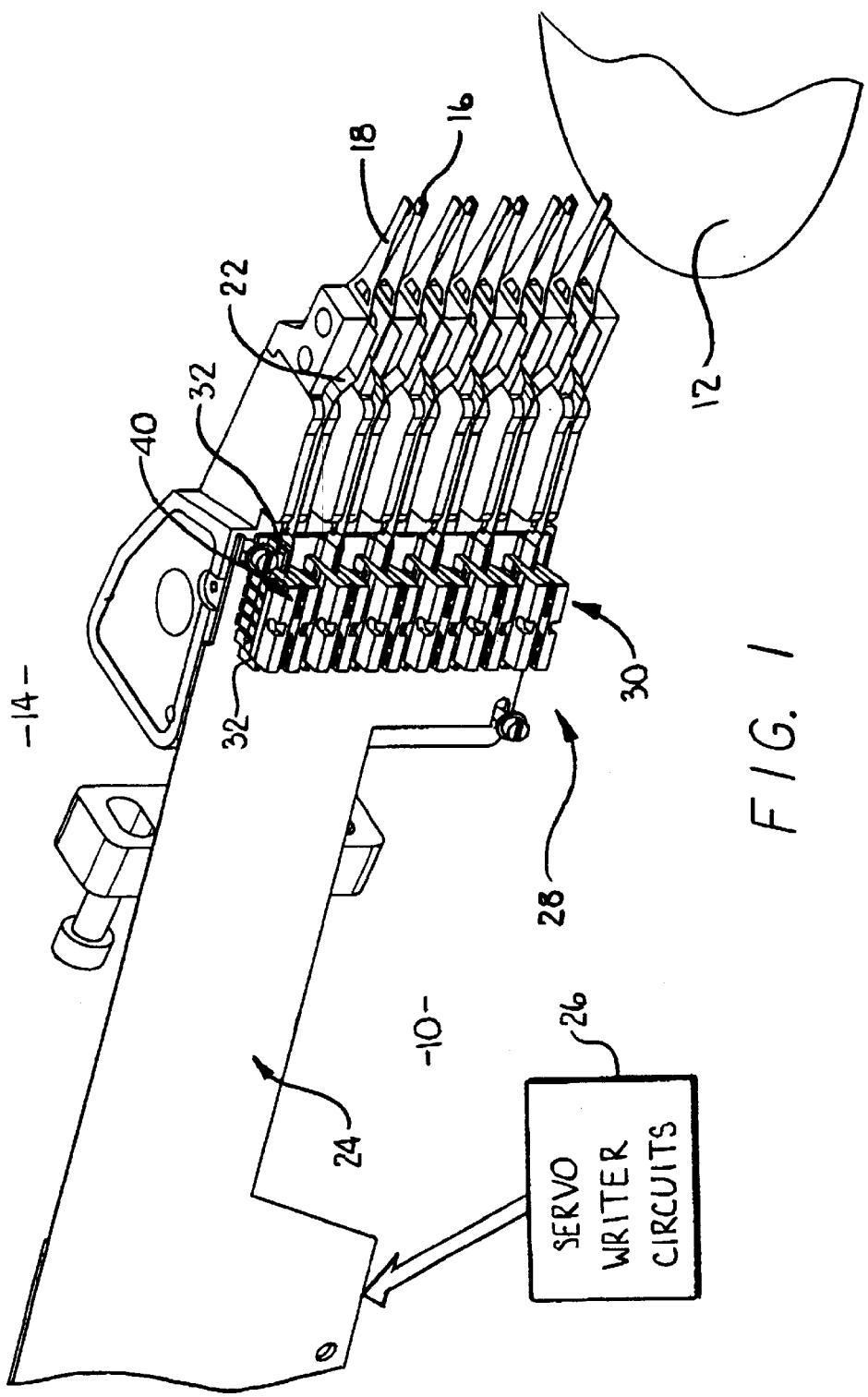
FIG. 1 is a perspective view of a servo writer.

Referring to the drawings more particularly by reference numbers, FIG. 1 shows a servo writer 10 used to write servo bits onto disks 12 (only one disk is shown), which will subsequently be installed into a hard disk drive (not shown) after completion of the servowriting process. The disks 12 are magnetically coupled to a plurality of heads 16. Each head 16 is mounted to a flexure arm 18 that is attached to an actuator structure which is typically called an "E-block" assembly 28. The actuator accurately positions heads 16 on disks 12. Each head 16 is also connected to a flexible circuit board 22, which provides electrical terminations to the read and write elements of each head 16. When the servowriter is fully assembled, the flexible circuit boards 22 are attached to a pre-amplifier flex circuit 24, which typically contains servo writer circuits 26 of the actuator.

The servo writing circuits 26 may include a R/W preamplifier, microprocessor, memory, digital to analog converters, amplifiers, etc. (not shown) that cause the heads 16 to magnetize and write servo bits onto the disks 12.

The E-block assembly 28 includes a flexible printed circuit board 24 that contains routing traces, pads, etc. that can provide an electrical path from the servo circuits 26 to the heads 16. The routing traces, pads, etc. are typically attached to a dielectric substrate as is known in the art. The E-block assembly 28 further has a plurality of connector assemblies 30 that couple the flexible circuit boards 22 to the flexible printed circuit board 24.

Figure 2:
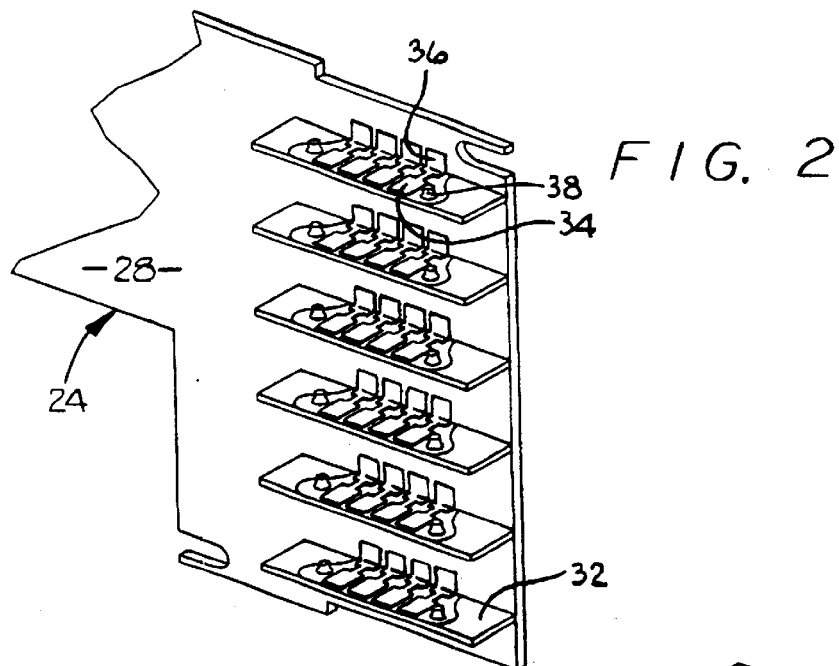
FIG. 2 is a perspective view showing a plurality of printed circuit boards attached to an arm of the servo writer.

As shown in FIG. 2, each connector assembly 30 includes a printed circuit board 32 that is soldered to the circuit board 24 of the E-block assembly 28. Each printed circuit board 32 may includes a plurality of contact pads 34 that are electrically connected to corresponding pads 36 of the circuit board 24. The contact pads 34 may be configured to match corresponding pads (not shown) of the flexible circuit boards 22. One or more of the circuit boards 32 may have contact pads 34 located on both sides of the board 32 so that a single connector assembly 30 can couple two flexible circuit boards 22 to the servo writer circuits 26. Each circuit board 32 may also have one or two alignment pins 38.

Referring to FIG. 1, each connector 30 may include a clamp 40 that presses a flexible circuit board 22 into the printed circuit board 32 so that the contact pads of the flex circuit 22 electrically connect to the contact pads of the circuit board 32. It should be noted that the flex circuits 22 are typically insulated on the side opposite the contact pads. Therefore the clamps 40 do not necessarily have to have electrical insulation qualities.

Figure 3:
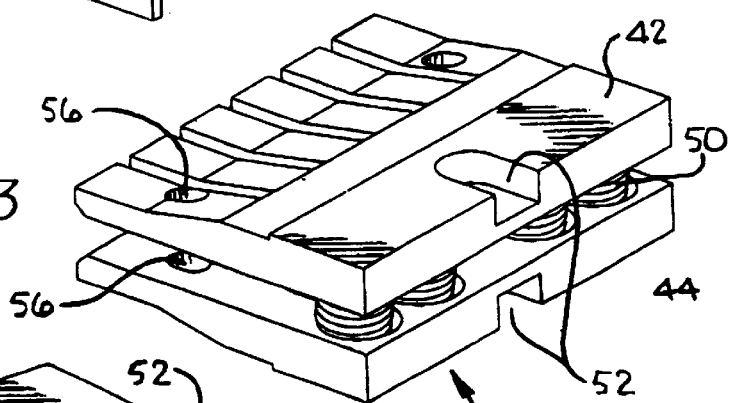
FIG. 3 is a rear perspective view of a clamp for a connector of the servo writer.
Figure 4:
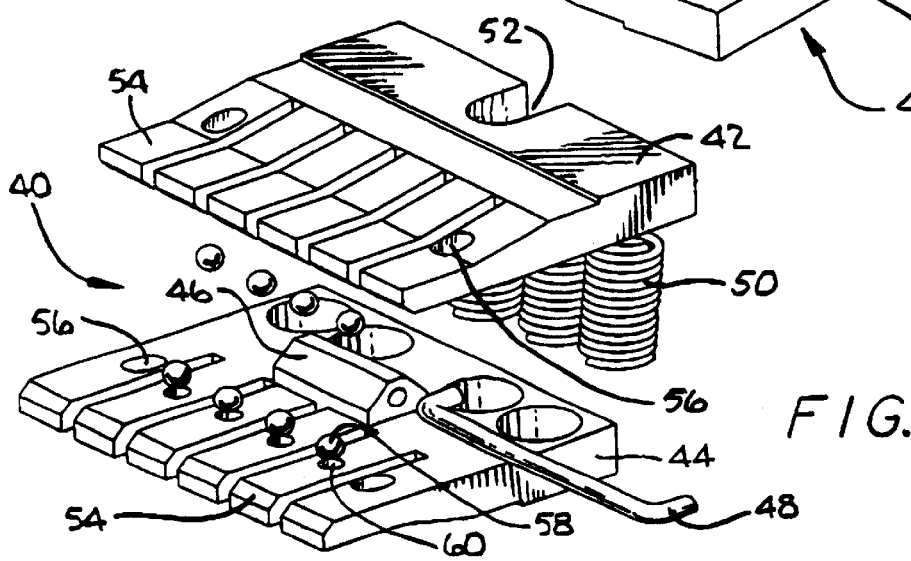
FIG. 4 is an exploded view of the clamp.

As shown in FIGS. 3 and 4, each clamp 40 includes a first pressure plate 42 and a second pressure plate 44. The pressure plates 42 and 44 pivot about corresponding mounts 46 of the plates 42 and 44. The pressure plates 42 and 44 are coupled together by a metal wire 48 that is attached to the mounts 46, such that a hinge-like action is obtained.

Each clamp 40 includes a plurality of springs 50 that bias the plates 42 and 44 into a closed position. The pressure plates 42 and 44 can be rotated by pressing the plates 42 and 44 at or near the notches 52. When released the springs 50 move the plates 42 and 44 back to the closed position. The pressure plates 42 and 44 may be constructed from a relatively inexpensive molded plastic material, which also has the advantage of being an electrical insulator.

Each pressure plate 42 and 44 may have a plurality of fingers 54. The outer fingers 54 include alignment holes 56 that are configured to receive the alignment pins 38 of the printed circuit board 32 shown in FIG. 2. Balls 58 may be pressed into corresponding depressions 60 in the middle fingers 54 of the plates 42 and 44. The balls 58 focus the spring forces exerted by the plates 42 and 44 onto the contact pads of the flex circuit 22 and circuit board 32. Use of hard metal balls provides superior wear resistance. However it may also be possible to mold the ball shape into the pressure plates 42 and 44. The fingers 54 provide flexibility in the plates 42 and 44 to compensate for variations in the thickness of both the flex circuit 22 and the circuit board 32.

In operation, the clamp 40 of each connector 30 is pushed to move the pressure plates 42 and 44 into an open position. One or more flexible circuit boards 22 are then placed onto the circuit board 32 so that the contact pads of the boards 22 and 32 are aligned. The pressure plates 42 and 44 are then released so that the springs 50 apply a spring force through the plates 42 and 44, and balls 56 onto the flex circuit 22. The spring force presses together the corresponding contact pads of the flex circuit 22 and the circuit board 32. The process is repeated for each connector 30 and corresponding flex circuit(s) 22.

After all of the flexible circuit boards 22 are attached to the connectors 30 the servo writer circuits 26 cause the heads 16 to write servo bits onto the disks 12. When the servowriting process is completed, the heads 16 are withdrawn from the disks 12, new disks are installed and the process is repeated. When the heads wear out, or are damaged, one or more clamps 40 are opened and the flexible circuit boards 22 are removed from the connectors 30, which then allows the head assemblies 18 to be removed.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

Although a servo writer has been shown and described, it is to be understood that the connector assembly may be used in other apparatuses such as a disk certifier, or a system that contains both a servo writer and a disk certifier. A disk certifier typically detects magnetic and/or surface defects in the surfaces of a hard disk. It may be desirable to test multiple hard disks. The stylus/heads used in some disk certifiers wear out and must be replaced. The connector assembly of the present invention allows for rapid replacement of the worn out heads.

What is claimed is:

1. An electrical connector assembly for an apparatus coupled to a hard disk, comprising:

a first pressure plate that has a plurality of fingers;

a second pressure plate;

a spring coupled to said first and second pressure plates; and, a printed circuit board located between said first and second pressure plates.

2. The assembly of claim 1, further comprising a plurality of balls attached to said first pressure plate.

3. The assembly of claim 2, further comprising a plurality of balls attached to said second pressure plate.

4. The assembly of claim 1, wherein said second pressure plate includes a plurality of fingers.

5. The assembly of claim 1, wherein said first and second pressure plates are constructed from a plastic material.

6. The assembly of claim 1, wherein said printed circuit board includes an alignment pin that extends through an alignment hole of said first pressure plate and an alignment hole in said second pressure plate.

7. An electrical connector assembly for an apparatus that is coupled to a flexible circuit board of a hard disk drive head assembly, comprising:

a first pressure plate that has a plurality of fingers;

a second pressure plate;

spring means for biasing said first pressure plates into a closed position; and, circuit board means for providing an electrical connection with the flexible circuit board when said first pressure plate is in the closed position.

8. The assembly of claim 7, further comprising a plurality of balls attached to said first pressure plate.

9. The assembly of claim 8, further comprising a plurality of balls attached to said second pressure plate.

10. The assembly of claim 7, wherein said second pressure plate includes a plurality of fingers.

11. The assembly of claim 7, wherein said first and second pressure plates are constructed from a plastic material.

12. The assembly of claim 7, wherein said circuit board means has alignment means for aligning with said first and second pressure plates.

13. A servo writer that writes servo information onto a disk coupled to a head, the head being coupled to a flexible circuit board, comprising:
   a first pressure plate;
   a second pressure plate;
   a spring coupled to said first and second pressure plates;
   a first printed circuit board located between said first and second pressure plates and coupled to the flexible circuit board; and,
   a servo writing circuit coupled to said first printed circuit board.

14. The servo writer of claim 13, further comprising a plurality of balls attached to said first pressure plate.

15. The servo writer of claim 14, further comprising a plurality of balls attached to said second pressure plate.

16. The servo writer of claim 13, wherein said first pressure plate includes a plurality of fingers.

17. The servo writer of claim 16, wherein said second pressure plate includes a plurality of fingers.

18. The servo writer of claim 13, wherein said first and second pressure plates are constructed from a plastic material.

19. The servo writer of claim 13, further comprising a second printed circuit board attached to said first printed circuit board and coupled to said servo circuit.

20. The servo writer of claim 13, wherein said first printed circuit board includes an alignment pin that extends through an alignment hole of said first pressure plate and an alignment hole in said second pressure plate.

21. A servo writer for writing servo information onto a disk coupled to a head, the head being coupled to a flexible circuit board, comprising:
   servo writing circuit means for writing servo information onto said disk;
   first circuit board means for coupling said flexible circuit board to said servo writing circuit means;
   a first pressure plate;
   a second pressure plate;
   spring means for biasing said first and second pressure plates into a closed position to apply pressure to said flexible circuit board and said first circuit board means.

22. The servo writer of claim 21, further comprising a plurality of balls attached to said first pressure plate.

23. The servo writer of claim 21, further comprising a plurality of balls attached to said second pressure plate.

24. The servo writer of claim 21, wherein said first pressure plate includes a plurality of fingers.

25. The servo writer of claim 24, wherein said second pressure plate includes a plurality of fingers.

26. The servo writer of claim 21, wherein said first and second pressure plates are constructed from a plastic material.

27. The servo writer of claim 21, further comprising second circuit board means for coupling said first circuit board means with said servo writing circuit means.

28. The servo writer of claim 21, wherein said first circuit board means has alignment means for aligning with said first and second pressure plates.

\* \* \* \* \*